US006456205B1

United States Patent
Russell et al.

(10) Patent No.: US 6,456,205 B1
(45) Date of Patent: Sep. 24, 2002

(54) ANTI-COLLISION WARNING LIGHTS AND METHOD OF USE

(75) Inventors: Sean Russell; Adrian Saunders, both of Somerset (GB); Larry Adrian Laforest, Apopka, FL (US)

(73) Assignee: Thales Optronics (Taunton) Ltd, Somerset (GB)

( * ) Notice: Subject to any disclaimer, the term of this patent is extended or adjusted under 35 U.S.C. 154(b) by 0 days.

(21) Appl. No.: 09/716,559

(22) Filed: Nov. 20, 2000

Related U.S. Application Data

(63) Continuation of application No. PCT/GB99/01596, filed on May 20, 1999.
(60) Provisional application No. 60/086,327, filed on May 21, 1998.

(51) Int. Cl.[7] .................................................. G08B 5/22
(52) U.S. Cl. .......................... 340/815.45; 315/185 R; 340/331; 340/981; 362/800
(58) Field of Search .................. 340/815.45, 815.65, 340/331, 981, 471; 362/227, 249, 252, 257, 293, 311, 362, 800; 315/185 R, 192, 246, 250, 291, 294, 295

(56) References Cited

U.S. PATENT DOCUMENTS

| | | | |
|---|---|---|---|
| 3,903,501 A | * | 9/1975 | Greenlee et al. ........ 340/331 X |
| 4,654,629 A | * | 3/1987 | Bezos et al. ........ 340/815.45 X |
| 5,122,781 A | | 6/1992 | Saubolle |
| 5,293,304 A | | 3/1994 | Godfrey |
| 5,594,433 A | | 1/1997 | Terlep |
| 5,608,290 A | | 3/1997 | Hutchisson et al. |
| 5,685,637 A | | 11/1997 | Chapman et al. |
| 5,850,126 A | | 12/1998 | Kanbar |
| 6,183,100 B1 | * | 2/2001 | Suckow et al. ......... 340/471 X |
| 6,268,702 B1 | * | 7/2001 | Fleck ..................... 315/185 R |

FOREIGN PATENT DOCUMENTS

| | | |
|---|---|---|
| DE | 41 17 289 A1 | 12/1992 |
| DE | 296 14 046 U1 | 11/1996 |
| FR | 2 711 884 A1 | 5/1995 |
| GB | 1 574 387 A | 9/1980 |
| WO | WO 95/23313 A1 | 8/1995 |
| WO | WO 97/29320 A1 | 8/1997 |
| WO | WO 98/21917 A1 | 5/1998 |

* cited by examiner

Primary Examiner—Thomas Mullen
(74) Attorney, Agent, or Firm—Akin, Gump, Strauss, Hauer & Feld, L.L.P.

(57) ABSTRACT

A warning light (10) for external use on an aircraft comprises a high-intensity light output light source (14,20). The light source comprises a plurality of light emitting diodes (40) which are arranged to be pulsed with an overdriving signal (32) to produce a higher than normal intensity flashing light output. The overdriving signal (32) is generated by a pulsed drive circuit (30) in response to timing signals received from a flash pattern box at a rate of between 0.67 Hz to 1.67 Hz.

22 Claims, 2 Drawing Sheets

ANTI-COLLISION WARNING LIGHTS AND METHOD OF USE

CROSS REFERENCE TO RELATED APPLICATION

This application is a continuation of International Application PCT/GB99/01596, filed May 20, 1999, the disclosure of which is incorporated herein by reference. This application also claims the benefit of U.S. provisional patent application No. 60/086,327, filed May 21, 1998.

BACKGROUND OF THE INVENTION

The present invention concerns improvements relating to anti-collision warning lights and more specifically to a high-intensity anti-collision warning light and a method of driving the same for external use on aircraft.

In the field of anti-collision lights, there is a safety requirement to provide high-intensity regularly pulsed light on the exterior of an aircraft to enable the aircraft to be visible in all weather conditions. The intensity of the light is therefore quite high, typically being far greater than 100 Candela. Also, the flashing of the anti-collision light means that it is far more readily detectable than a light having a constant illumination. It should be noted that the flashing rate cannot be too high, namely above 25 Hz, because the light will be perceived by the human eye as being continuous. Furthermore, the intensity or intensity distribution has to be constant for each light flash.

Existing anti-collision lights, such as those described in U.S. Pat. Nos. 3,903,501 and 5,293,304, for example, use xenon flash tubes to generate the required intensity of light. The xenon flash tubes are driven by a discharge of an electrical capacitance into the flash tube, and so driving circuits include large banks of discharge capacitors. In addition, xenon flash tubes have high operating voltages that are generated in their driving circuits by transformers stepping up voltages to the required levels.

These requirements of often large, electrolytic capacitor banks and bulky transformers mean that the driving circuits tend to be large, heavy and expensive. This is particularly disadvantageous when several lights and their respective driving circuits are provided in an aircraft, where size and weight are very important issues. In addition, power consumption for these circuits can be undesirably high.

Conventional incandescent lamps that are used for aircraft navigation lights, for example, are far cheaper and require simpler, lighter driving circuits. However, incandescent lamps cannot generate the high intensity of light output required for warning lights.

It is desired to overcome at least some of the problems described above and to provide an alternative to existing high-intensity warning light technology.

BRIEF SUMMARY OF THE INVENTION

The present invention resides in the appreciation that light emitting diodes can be used to replace xenon flash tubes in anti-collision warning lights for aircraft, and can be appropriately controlled to generate the required high-intensity light output. Under normal operation, light emitting diodes cannot generate the required light intensity levels, and previously this has mitigated against the use of light emitting diodes in high-intensity light output applications. However, the inventors of the present invention have determined that by overdriving a plurality of light emitting diodes with a pulsed control signal, the light output can be dramatically increased without overheating or otherwise damaging the light emitting diodes.

According to one aspect of the present invention, there is provided an anti-collision warning light for external use on an aircraft, the anti-collision warning light comprising: a light source having a plurality of light emitting diodes which are arranged to be pulsed with an overdriving signal to produce a higher than normal intensity flashing light output; and means for generating the overdriving signal, the signal comprising a sequence of drive pulses, each driving pulse having a magnitude sufficient to cause said relatively high-intensity flashing light output, the light source and the generating means being arranged such that in use the intensity of the generated light flashes is constant and is at least 100 Candela per flash.

The use of light emitting diodes obviates the need for large banks of capacitors and bulky transformers that are required for driving the xenon flash tubes. The driving circuit of the present invention can be realized in a simple control circuit that generates the required series of drive pulses at a relatively low voltage. Accordingly, the control circuit can be significantly smaller, lighter and cheaper than that of the prior art anti-collision warning lights and also has far lower power consumption. This latter aspect is particularly advantageous as aircraft lights are mostly operated from a rechargeable battery power supply.

Another significant advantage of using light emitting diodes in place of xenon flash tubes is that the light emitting diodes need to be replaced far less frequently than flash tubes. For example, xenon flash tubes last a few hundred flying hours, whereas light emitting diodes can last tens of thousands of flying hours. The longer operational life and greater reliability of light emitting diodes (light emitting diodes are less likely to malfunction than xenon flash tubes) can also provide significant cost savings in the long term. This is not only because of reduced costs of replacement components but more significantly because of the reduced costs of maintenance and/or labor. Furthermore, light emitting diodes are far more robust than flash tubes with far greater resistance to shock and vibration. For example, the light emitting diodes of the presently preferred embodiment of the invention, can withstand 5000 G of force and also random vibrations without breaking down.

Flash tubes also require shielding to prevent the electromagnetic radiation generated by the high-voltage transformers from affecting other equipment in the proximity of the warning light. A further advantage of light emitting diodes over flash tubes is that there is no requirement for this electromagnetic shielding, because light emitting diodes do not require high-voltage transformers.

The generating means can be provided on the light housing to provide a self-contained compact lighting unit. Also, the generating means is preferably configured to be operable in response to a received timing signal. The timing signal can be provided by an appropriate flash pattern box which can be positioned, for example, remotely from the anti-collision warning light. The flash pattern box typically includes a microprocessor and associated memory, which produce timing control signals at an appropriate rate, which are used by the generating means to cause the light source to output light pulses, which are perceived as regular intermittent illumination or as a regular sequence of light flashes.

The light emitting diodes are preferably set out in an array. This advantageously allows the light emitting diodes to be provided in a compact unit with a high light output density. In addition, the array may comprise a plurality of groups of light emitting diodes, the groups being connected together in parallel and each group comprising a plurality of light emitting diodes connected in series. This arrangement incorporates built-in redundancy, which advantageously prevents catastrophic failure of the light emitting diode array, because if one diode fails, the whole unit will not also fail. Rather, the series or string of diodes, which contains the defective light emitting diode, will fail and the other strings of diodes will be unaffected.

Preferably, the light emitting diodes are arranged to output a selected color of light which is dependent on the selected mode of operation. This may be achieved by the light emitting diodes comprising selectable sets of light emitting diodes, each set being capable of emitting a particular color of light. In this way, a single array of light emitting diodes, for example, can generate different warning signals depending on the color of the light output.

A further advantage of using light emitting diodes in place of xenon flash tubes is that light emitting diodes generate specific narrow wavelength bands of light and for military aircraft applications the amount of infra-red light that is generated can be accurately controlled. Accordingly, the use of light emitting diodes is inherently night vision goggle (NVG) friendly because it does not blind pilots flying on NVGs with excess infra-red light, and also there is no need to use special filter glass for reducing excess infra-red light from the warning light.

The warning light may comprise a plurality of light sources. This is advantageous when the warning light is to provide an increased field of view, in which case each source faces a different direction. For a maximal field of view, the plurality of light sources can be arranged about an axis to be radially outwardly facing and to illuminate substantially 360 degrees of view around the axis.

Preferably, the or at least one of the light sources comprises a plurality of infra-red light emitting diodes. The infra-red diodes provide a warning light which is detectable at night with NVGs. This is particularly for use on military aircraft during covert operations. The infra-red diodes are driven by a pulsed control signal in the same manner as the other light emitting diodes to generate the required high-intensity light output. When both infra-red and visible light sources are provided, the warning light can be switched between visible and covert operation modes. When viewed through NVGs the output of the infra-red light source appears identical to the visible light source. This aids night vision training because this type of training can advantageously be carried out in daylight conditions using NVGs.

Preferably, the light output from the warning light is flashed at a rate between 40 to 100 flashes per minute, namely 0.67 Hz to 1.67 Hz. This rate ensures that the output of the anti-collision warning light is relatively easy to detect visually by observers. Furthermore, this rate meets the requirements for international aviation authorities concerning the use of the anti-collision light on an aircraft.

The drive signals from the generating means to the light source are preferably in the form of a rectangular shaped waveform. This waveform provides an optimal light output over time from the light source as compared to other possible waveforms. The rectangular-shaped pulses preferably have a duty cycle of not more than 10%. This limit minimizes the power consumption for the warning light while still providing sufficient on time for generating the required intensity of light output.

In a presently preferred embodiment of the present invention, the set output of the light emitting diodes is controlled by the drive pulses of the overdriving signal being varied to adjust the driving current supplied to each of the light emitting diodes. However, it is also possible to control the light output by the drive pulses of the overdriving signal being varied to adjust the driving voltage applied to each of the light emitting diodes.

According to another aspect of the present invention, there is provided a method of driving a flashing anti-collision warning light for external use on an aircraft, the method comprising: pulsing a light source having a plurality of light emitting diodes with an overdriving signal to produce a higher than normal intensity flashing light output; and generating the overdriving signal, the signal comprising a sequence of drive pulses, each drive pulse having a magnitude sufficient to cause said relatively high-intensity flashing light output, the generating and pulsing steps being arranged such that in use the intensity of the generated light flashes is constant and is at least 100 Candela per flash.

According to another aspect of the present invention there is provided an anti-collision warning light as described above, in combination with a control means which is arranged to control a time sequence of light flashes output from the anti-collision warning light.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown. In the drawings.

DETAILED DESCRIPTION OF THE INVENTION

Figure 1:
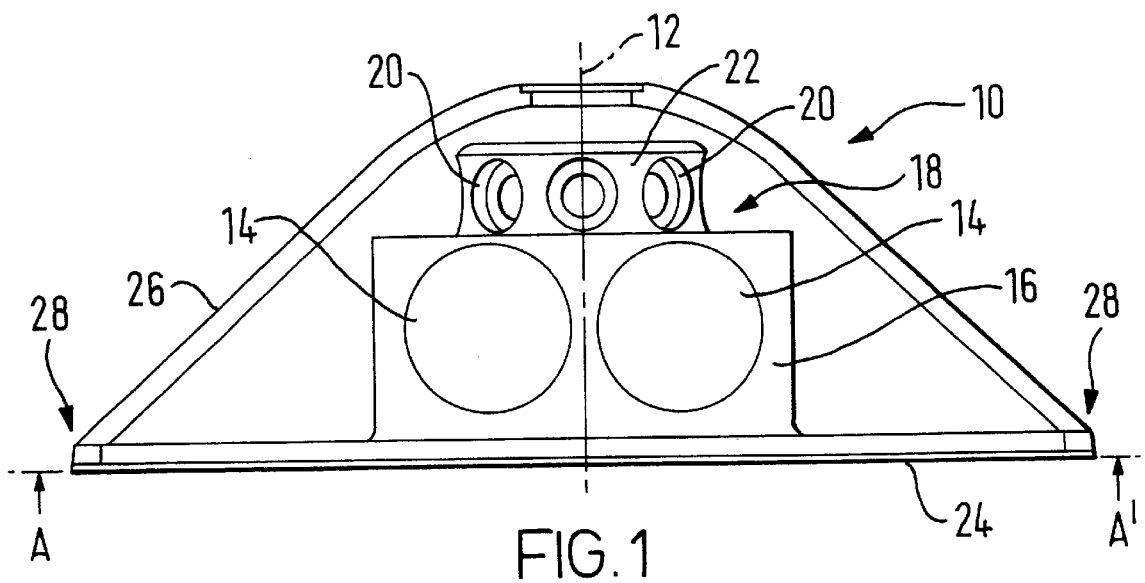
FIG. 1 is a side view of an anti-collision light embodying the present invention.
Figure 2:
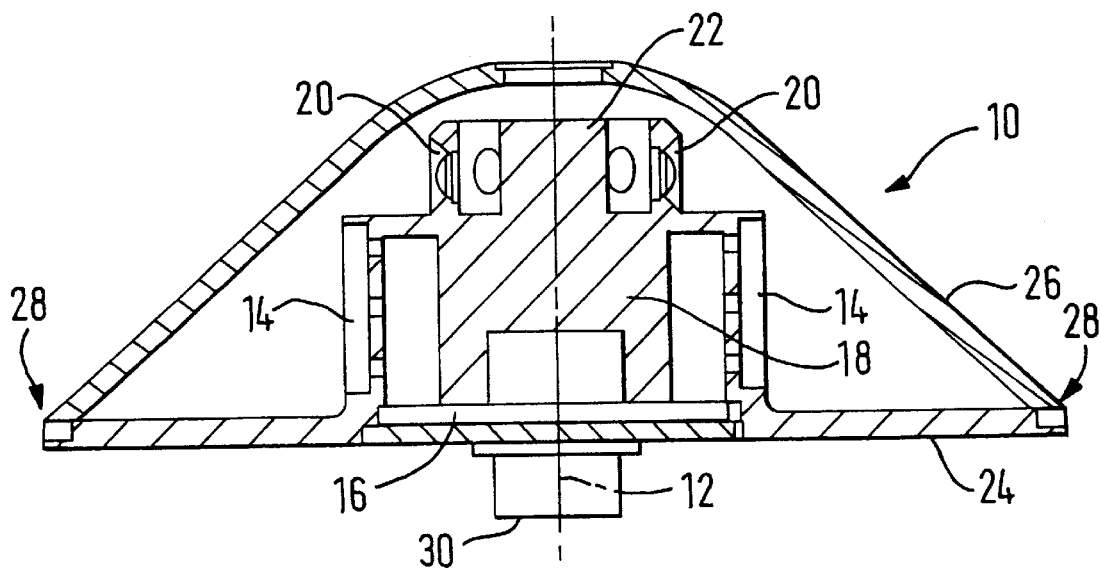
FIG. 2 is a cross-sectional view of the anti-collision light of FIG. 1 taken through section AA (as set out in FIG. 3)
Figure 3:
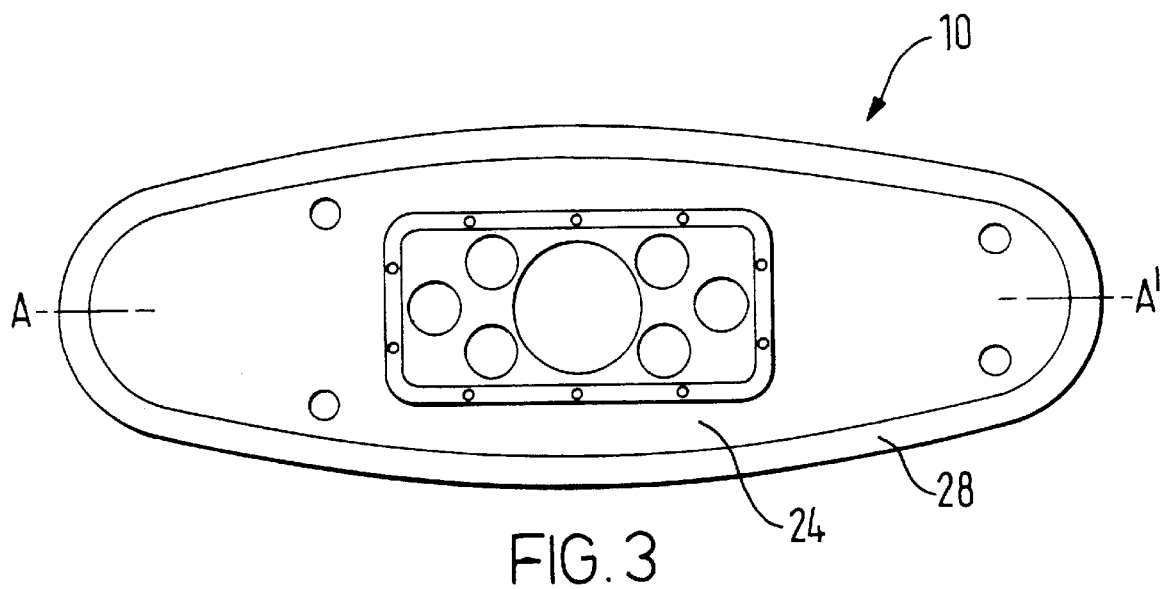
FIG. 3 is an underside view of the base of the anti-collision light of FIG. 1.

Referring now to FIGS. 1, 2 and 3, a presently preferred embodiment of the invention is shown in the form of an anti-collision light 10. The anti-collision light 10 is for use on the fuselage of a military aircraft (not shown) and provides 360 degrees of illumination around a central axis 12 of the light 10.

The anti-collision light 10 comprises six normally visible light emitting diode arrays 14, which are assembled in the lower portion 16 of an aluminum central housing 18. Eight infra-red light emitting diode arrays 20 are affixed to an upper part 22 of the housing 18. Each light emitting diode array 14, 20 faces radially outwardly from the central axis 12 so as to cover the entire illumination range of 360 degrees.

The central housing 18 is mounted on a base plate 24 and is enclosed by a transparent plastic cover 26. However, the cover 26 may alternatively be translucent or made from glass. The cover 26 allows both the generated infra-red light and the visible light to pass therethrough. The cover 26 can be sealed to the edges 28 of the base plate 24 to provide a weather-proof enclosure for the light emitting diode arrays 14, 20.

A drive unit 30, for supplying the light emitting diode arrays 14,20 with appropriate driving signals, is mounted to the underside of the base plate 24. The drive unit 30 receives timing signals from a flash pattern box (not shown) and these signals are converted into drive signals 32 for each light emitting diode array 14,20. The drive signals 32 are distributed to the light emitting diode arrays 14,20 by wiring (not shown) between the drive unit 30 and each of the fourteen light emitting diode arrays 14,20.

Figure 4:
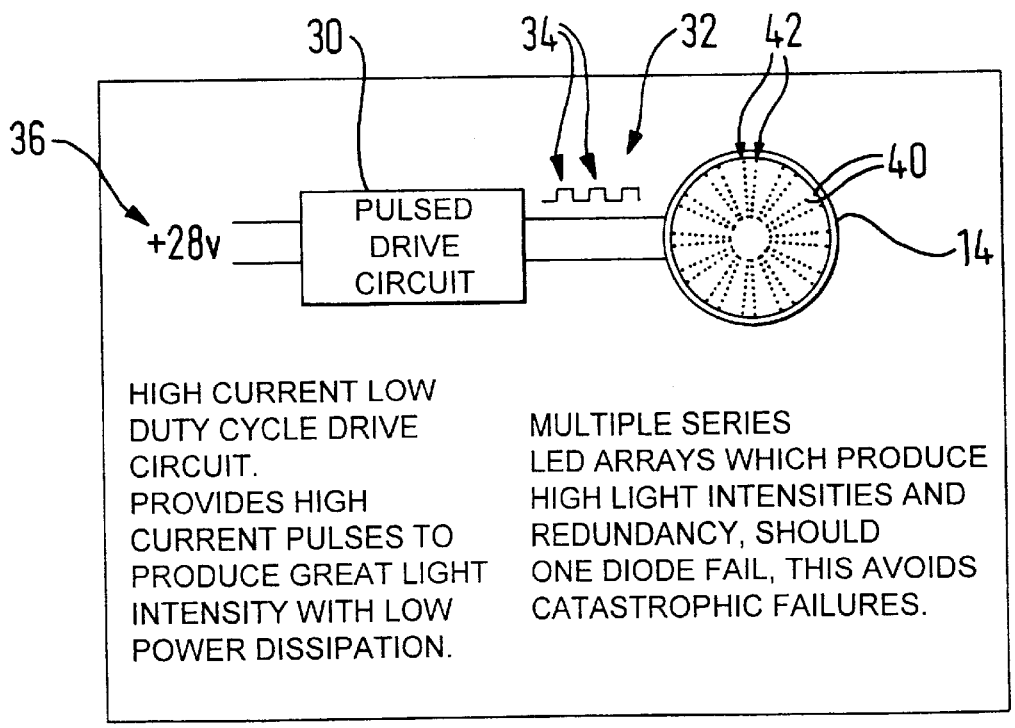
FIG. 4 is a schematic block diagram of the electrical circuit employed in the anti-collision light of FIG. 1.

Referring now to FIG. 4, the details of the drive unit operation are now described. For the sake of convenience, FIG. 4 shows the drive unit 30 controlling a single light emitting diode array 14. However, it is to be appreciated that the drive unit 30 controls each one of the light emitting diode arrays 14,20. The pulsed drive unit 30 receives its timing signals from a remotely positioned flash pattern box, which is also not shown. The flash pattern box is typically connected to several anti-collision lights 10 and stores information for each anti-collision light 10 regarding the desired color output, the desired flash rate and any changes to the flash rate.

The pulsed drive unit 30 takes the timing signals from the flash pattern box and converts these to the drive pulses 34 for the light emitting diode array 14. Each pulse 34 is rectangular in shape and the mark/space ratio is at least 1/10. In other words, the duty cycle for the drive signals 32 is 10% or less. The pulses 34 are current pulses, which have a magnitude in excess of the diode array's stated maximum current rating. In this embodiment, the maximum current rating for a string of light emitting diodes is 50 ma, and each of the drive signal pulses 34 has a magnitude of 200 ma. This generates an output which is well in excess of 100 Candela and can reach up to 1000 Candela. Accordingly, the light emitting diode array 14 is overdriven by the drive signals 32, but because the signal 32 is pulsed at a rate between 0.67 Hz and 1.67 Hz, the light emitting diode array 14 does not overheat and there is no other long term damage.

The actual light output is dependent on the power input into the light source 14. Accordingly, the light output can be varied by changing the duty cycle of the drive signal 32 as well as its magnitude.

The drive unit 30 is powered by a +28 Volt power supply 36. The drive signals 32 are, in this embodiment, output at a constant voltage of +28 Volts, which is the stated maximum operational voltage of the light emitting diode arrays. However, in another embodiment of the present invention, the voltage can be varied to overdrive the light emitting diode arrays to achieve the high-intensity light output. For example, the pulses 34 can be output at +30 Volts rather than +28 Volts.

The light emitting diode array 14 comprises a plurality of high-intensity output light emitting diodes 40. The light emitting diode array 14 has a plurality (24 shown in FIG. 4) of groups or strings 42 of light emitting diodes 40. The strings 42 are connected together in parallel, and each string 42 comprises a plurality (9 shown in FIG. 4) of light emitting diodes 40 connected in series. If one diode fails, then the string 42 to which the diode 40 belongs stops working. However, as the other strings 42 are connected in parallel, the light emitting diodes 40 in these strings 42 continue to function correctly. This arrangement uses the built-in redundancy to prevent catastrophic failure of the light emitting diode array 14 if one diode 40 fails.

The light emitting diode array 14 is arranged to output a selected color of light when the appropriate signals are received from the drive unit 30. The array 14 comprises sets of selectable strings 42 of light emitting diodes 40, the strings 42 of each set are capable of emitting a particular color of light. In this particular embodiment, strings 42 of light emitting diodes 40 emitting visible red light and strings 42 of light emitting diodes 40 emitting near white light are provided alternately about the light emitting diode array 14. The strings 42 of the red light diodes 40 are connected together in parallel, but are not connected to the white light diodes 40. Each type of string 42 is driven independently by the drive unit 30 in dependence on the selected mode of operation. Switching between the banks of diodes is carried out under control of the flash pattern box. However, this can also be carried out by regulating a control voltage within a switch box (not shown) in the cockpit.

The diode array 14 is a single unit with each diode and its interconnections forming an integrated circuit at the surface of a substrate. The substrate is made from a ceramic material, which is supported on an aluminium base. For generating white light, the diodes comprise sapphire crystal coated with a phosphor.

Having described particular preferred embodiments of the present invention, it is to be appreciated that the embodiments in question are exemplary only and that variations and modifications such as will occur to those possessed of the appropriate knowledge and skills may be made without departure from the spirit and scope of the invention as set forth in the appended claims. For example, it is not necessary to have light emitting diode arrays covering 360 degrees of viewing angle. Rather, for forward anti-collision lights, which require a narrower field of view, the light emitting diode arrays need only cover a smaller angle. Also, it is not necessary to provide the infra-red light emitting diode arrays 20 for commercial/civil aircraft, for example. The light emitting diodes 40 can all be of the same type producing a light output of a single color for a dedicated warning light, for example a visible white anti-collision light or a visible red anti-collision light. It is also not necessary for the diode arrays 14,20 to be circular; they can be any desired shape, for example square shaped.

We claim:

1. An anti-collision warning light for use on an aircraft, the anti-collision warning light comprising:
   a light source located on an exterior of the aircraft having a plurality of light emitting diodes which are arranged to be pulsed with an overdriving signal to produce a higher than normal intensity flashing light output; and
   an overdriving signal generator, the signal comprising a sequence of drive pulses, each driving pulse having a magnitude sufficient to cause said relatively high-intensity flashing light output,
   the light source and the overdriving signal generator being arranged such that in use the intensity of the generated light flashes is constant and is at least 100 Candela per flash.

2. The anti-collision warning light according to claim 1, wherein the plurality of light emitting diodes are set out in an array.

3. The anti-collision warning light according to claim 2, wherein the array comprises a plurality of groups of light emitting diodes, the groups being connected together in parallel and each group comprising a plurality of light emitting diodes connected in series.

4. The anti-collision warning light according to claim 1, wherein the light source comprises a substrate on which is provided the plurality of light emitting diodes.

5. The anti-collision warning light according to claim 1, wherein the light source is housed on a base mounting plate and is protected by a translucent or transparent cover.

6. The anti-collision warning light according to claim 5, wherein the translucent cover comprises a light filter.

7. The anti-collision warning light according to claim 1, wherein the light emitting diodes are arranged to output a selected color of light in dependence on a selected mode of operation.

8. The anti-collision warning light according to claim 7, wherein the light emitting diodes comprise selectable sets of light emitting diodes, each set being capable of emitting a particular color of light.

9. The anti-collision warning light according to claim 1, comprising a plurality of light sources wherein each light source comprises a plurality of light emitting diodes.

10. The anti-collision warning light according to claim 9, wherein the plurality of light sources are arranged about an axis to be radially outwardly facing and illuminate substantially 360 degrees of view around the axis.

11. The anti-collision warning light according to claim 9, wherein at least one of the light sources comprises a plurality of infra-red light emitting diodes.

12. The anti-collision warning light according to claim 1, wherein the light source comprises a plurality of infra-red light emitting diodes.

13. The anti-collision warning light according to claim 1, wherein the voltage of the overdriving signal supplied to the plurality of light emitting diodes is greater than that normally required to operate the plurality of light emitting diodes with a constant light output.

14. The anti-collision warning light according to claim 1, wherein the overdriving signal generator is operable in response to a received timing signal.

15. The anti-collision warning light according to claim 1, wherein each drive pulse is rectangular shaped.

16. The anti-collision warning light according to claim 15, wherein the duty cycle of the sequence of pulses is lower than 10%.

17. The anti-collision warning light according to claim 1, wherein the drive pulses of the overdriving signal can be varied to adjust a driving current supplied to each of the light emitting diodes.

18. The anti-collision warning light according to claim 1, wherein the drive pulses of the overdriving signal can be varied to adjust a driving voltage applied to each of the light emitting diodes.

19. The anti-collision warning light according to claim 1, wherein the plurality of light emitting diodes are arranged to be pulsed at a rate of 40 to 100 pulses per minute to produce a corresponding rate of flashing light output.

20. The anti-collision warning light according to claim 1, in combination with a controller which is arranged to control a time sequence of light flashes output from the anti-collision warning light.

21. A method of driving a flashing anti-collision warning light for use on an aircraft, the method comprising:

pulsing a light source having a plurality of light emitting diodes, located on an exterior of the aircraft, with an overdriving signal to produce a higher than normal intensity flashing light output; and generating the overdriving signal, the signal comprising a sequence of drive pulses, each drive pulse having a magnitude sufficient to cause said relatively high-intensity flashing light output, the generating and pulsing steps being arranged such that in use the intensity of the generated light flashes is substantially constant and is at least 100 Candela per flash.

22. An improved aircraft anti-collision warning apparatus of a type including a flashing light source, the improvement comprising:

an overdriving signal generator which pulses the light source with an overdriving signal to produce a flashing light output having a higher than normal intensity, wherein said light source comprises a plurality of light emitting diodes which are arranged to produce the flashing light output having a substantially constant intensity of at least 100 Candela per flash when pulsed by the signal generator.

\* \* \* \* \*

UNITED STATES PATENT AND TRADEMARK OFFICE
CERTIFICATE OF CORRECTION

PATENT NO. : 6,456,205 B1
DATED : September 24, 2002
INVENTOR(S) : Sean Russell et al.

It is certified that error appears in the above-identified patent and that said Letters Patent is hereby corrected as shown below:

<u>Title page,</u>
Item [73], Assignees, should read:
-- Thales Optronics (Taunton) Ltd., Somerset (GB)
 and Micro Engineering Inc., Apopka, FL. --.

Signed and Sealed this

Eighth Day of March, 2005

JON W. DUDAS
*Director of the United States Patent and Trademark Office*